United States Patent [19]
Daniel

[11] Patent Number: 5,905,560
[45] Date of Patent: May 18, 1999

[54] HEAD GEAR AND EYEGLASS RETAINER SYSTEM

[76] Inventor: Wallace V. Daniel, 2519 Grant Ave., Panama City, Fla. 32405

[21] Appl. No.: 09/178,777

[22] Filed: Oct. 26, 1998

[51] Int. Cl.$^6$ ....................................................... G02C 3/00
[52] U.S. Cl. .......................... 351/157; 351/156; 351/155; 2/10; 2/13
[58] Field of Search .................................... 351/156, 157, 351/158, 41, 155; 2/10, 12, 13

[56] References Cited

U.S. PATENT DOCUMENTS 5,373,583  12/1994  Birum ............................................ 2/10
5,778,448   7/1998  Maher ........................................... 2/10

*Primary Examiner*—Hung Xuan Dang
*Attorney, Agent, or Firm*—William B. Noll

[57] ABSTRACT

A personal eyeglass and head gear retainer system to protect the user thereof from the loss of such items. The system comprises, in combination, a conventional style head gear, preferably in the form of a baseball cap or a sun visor, where the head gear features a discontinuous peripheral rim, and conventional style eyeglasses, such as sunglasses. Included in the combination is a pair of flexible cords of a discrete length and joined together at an intermediate position along the lengths. A first end of each cord is secure to the peripheral rim of the head gear, and a second end is secured to a respective free end of the eyeglass ear supports.

7 Claims, 1 Drawing Sheet

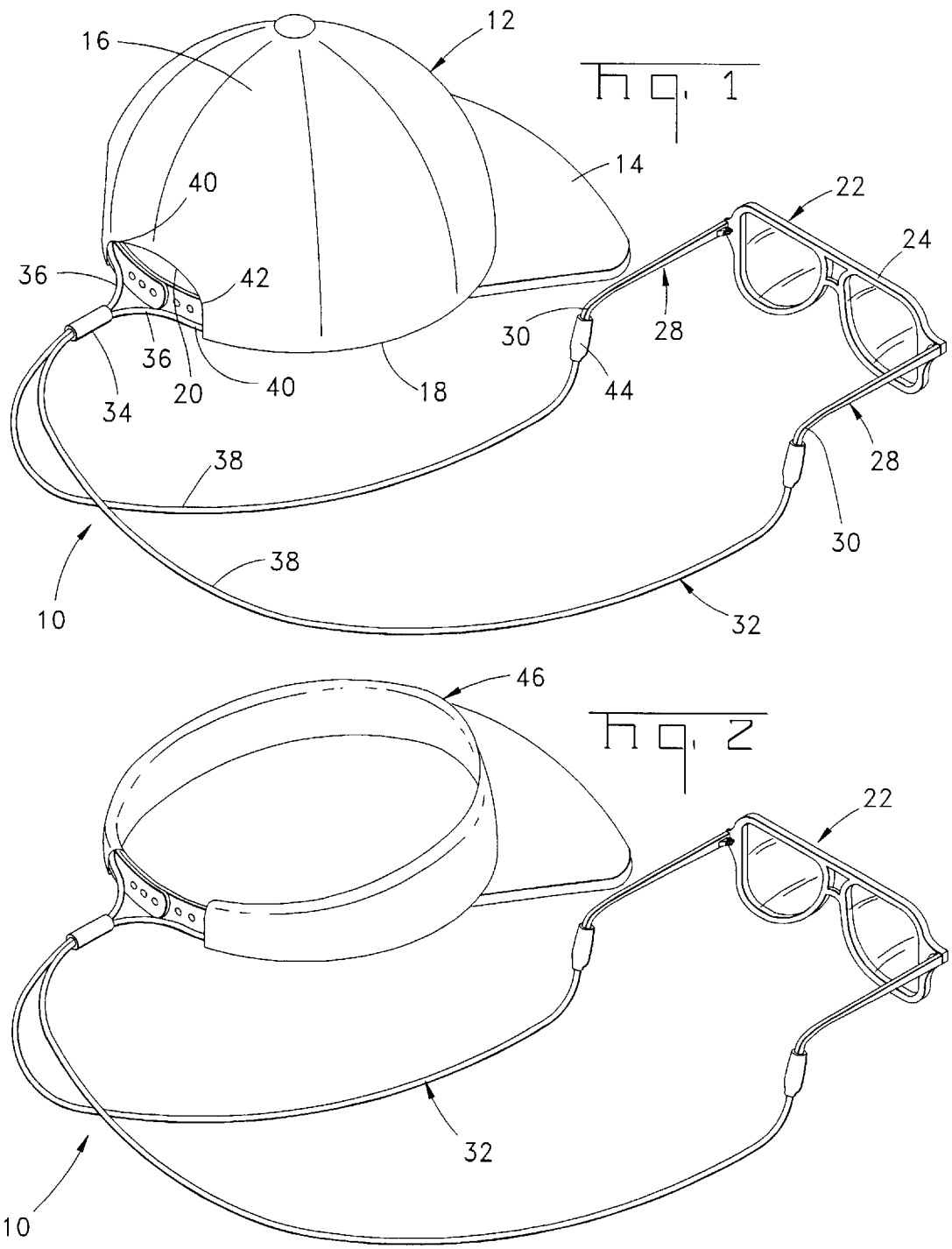

HEAD GEAR AND EYEGLASS RETAINER SYSTEM

FIELD OF THE INVENTION

This invention relates to the field of a combination neck retainer system for various head gear, such as a cap, and eyeglasses, such as sunglasses.

BACKGROUND OF THE INVENTION

The present invention is directed to a personal retainer system, such as for head gear and eyeglasses, that may be worn by a user on a windy day where one's hands may not be free to hold a fleeting cap or remove and hold eyeglasses. Such a system can be particularly valuable to a sport fisherman, or even a golfer whose hands are generally occupied with his/her chosen activity.

Eyeglass retainers, in the form of a chain worn about the neck and removably secured to the ear stems of eyeglasses, are quite common today. However, there are no known systems or devices that can perform the dual function of allowing one to remove and conveniently position the eyeglasses on one's chest, while also protecting against the loss of a cap, for example, that might occur on a windy day.

U.S. Pat. No. 5,778,448, to Maher, teaches an assembly for removably attaching sunglasses to the bil of a baseball cap. The assembly comprises a flexible main frame bridge which has hinges with teeth, a pair of clamps which grip the bill of the cap and which are adjustable by means of teeth interlocking with the teeth on the hinges, and a clamp which fits the main frame bridge and allows the sunglasses to be flipped up or down. While the assembly thereof appears to recognize the need for a user to have a sun protecting cap in combination with sunglasses, it does not provide an assembly to protect against losing same on a windy day.

The manner by which the system hereof provides such protection, particularly for a person whose hands are occupied, will become apparent to those skilled in the art from the following specification, especially when read in conjunction with the accompanying drawings.

SUMMARY OF THE INVENTION

The present invention relates to a retainer system for securing a light-weight head gear, such as a baseball style cap, and eyeglasses, about the neck of a user. The system hereof, in combination, comprises a flexible style head gear, as known in the art, having a discontinuous peripheral rim for positioning about the head of a user, and a set of eyeglasses having a pair of ear supports. Each ear support is an elongated member with a first end preferably hinged to the eyeglasses, and a second free end for engaging the ear of the user. Joining the head gear and eyeglasses is a pair of flexible cords of a discrete length and joined together at an intermediate position along the lengths. A first end of each cord is secured to the peripheral rim of the head gear, and a second end secured to a respective free end of the eyeglass ear supports. In a preferred arrangement, the intermediate joint for the respective cords, which may be adjustable, is in close proximity to the ends secured to the peripheral rim. In use, this intermediate joint lies at the back of the user's neck with the cords diverging therefrom around the user's neck to connect to the eyeglasses. Should a gust of wind strike the user, the head gear may flip off but will be retained by the user until repositioned on his head. Further, if the eyeglasses, such as sunglasses, are not required, they may be removed to rest on the user's chest.

Accordingly, an object of this invention is to provide a simple and convenient means to secure a suitable head gear to one's body, while providing a convenient combination system for securing a set of eyeglasses.

Another object hereof is the provision of an article protection system against the loss of such articles.

These and other objects will become apparent to those skilled in the art in the further description to follow.

BRIEF DESCRIPTION OF DRAWINGS

FIG. 1 is a perspective view of the head gear and eyeglass retainer system of this invention, where the head gear shown is a baseball style cap.

FIG. 2 is a perspective view similar to FIG. 1, showing the head gear in the form of a sun visor.

DETAILED DESCRIPTION OF PREFERRED EMBODIMENTS

The present invention is directed to a retainer system for securing personal items, such as a set of eyeglasses and head gear, about the neck of the user thereof. The system hereof will now be described with reference to the accompanying drawings, where like reference numerals represent like components or features in the two views.

FIG. 1 illustrates a preferred form of the retainer system 10 according to this invention. The combination system comprises a conventional style head gear 12, such as in the form of a baseball cap, where said head gear may include an arcuate shaped visor portion 14. Additionally, the head gear 12 includes a cloth-like cover 16, as known in the art, and a discontinuous peripheral rim 18 to which the cover 16 is secured. Since many types of flexible head gear are designed to accommodate various head sizes, a gap 20 may be provided in the cover 16. In other words, the gap may expand or contract, as desired.

A second component of the combination is a set of conventional eyeglasses 22, such as sunglasses, where such set includes a pair of lenses mounted in a frame 24, and a pair of ear supports 28, preferably hinged at opposite ends of the frame 26. The ear supports 28 typically include a free end 30 bent in a downward direction to override the user's ears.

The final component to the combination is a pair of elastomeric type cords 32, each of a distinct length and joined together at an intermediate location 34. In a relaxed and uncombined mode, the joined cords form an "X" having a pair of minor or shorter legs 36 and a pair of major or longer legs 38. The free ends 40, of the minor legs 36, are secured respectively to the rim ends 42 of the peripheral rim 18.

The remaining or major legs 38 include free ends 44 to be attached to the respective free ends 30 of the ear supports 28. While various means may be provided to secure the free ends 44 to the ear supports, a preferred means includes an axial bore in the free end 44 with the ear support free end 30 slidably and snugly received within the axial bore.

To use, with the three components secured together, as described above, the attached major legs 38 are placed over the user's head to straddle the neck, with the eyeglasses 22 on the user's chest, and the head gear 12 resting on the user's back. The head gear may then be placed on the user's head, and the eyeglasses over the user's nose and ears. Should the head gear 12 be inadvertently blown off, such as may occur on a windy day, it will not be blown away and lost.

FIG. 2 is a perspective view, similar to FIG. 1, where the head gear 46 is a traditional sun visor, i.e. without the flexible cover as found with a cap.

While the invention has been described and illustrated in two preferred embodiments, it is recognized that additions and modifications may be made to the system by those skilled in the art, without departing from the spirit and scope of the invention. Accordingly, no limitation is intended to be imposed on this invention except as set forth in the following claims.

I claim:

1. A retainer system for securing head gear and eyeglasses about the neck of a user, said system comprising:

a) a flexible style head gear having a discontinuous peripheral rim for positioning about the head of a user;

b) a set of eyeglasses having a pair of ear supports, each said support being an elongated member with a first end hingedly joined to said eyeglasses, and a second free end for engaging the ears of a user; and, c) a pair of flexible cords of discrete lengths and joined together at an intermediate position along said lengths, where a first end of each said cord is secured to said peripheral rim, and a second end of each said cord is secured to a respective said second free end.

2. The retainer system according to claim 1, wherein said cords are secured to separate ends of said peripheral rim.

3. The retainer system according to claim 1, wherein each said second cord ends are includes a circular rcess for securely engaging said free ends.

4. The retainer system according to claim 1, wherein said intermediate joint is positioned in close proximity to said first ends of said cords.

5. The retainer system according to claim 1, wherein said head gear includes an arcuate-shaped visor portion extending from said peripheral rim.

6. The retainer system according to claim 5, wherein said head gear is a baseball style cap.

7. The retainer system according to claim 5, wherein said head gear is a sun visor.

* * * * *